United States Patent [19]

Kruglii et al.

[11] Patent Number: 4,908,829

[45] Date of Patent: Mar. 13, 1990

[54] LASER FREQUENCY STABILIZATION BY ACTIVE RESONATOR LENGTH REGULATION

[75] Inventors: Vassil P. Kruglii; Stanislav P. Shurulinkov, both of Sofia, Bulgaria

[73] Assignee: Su "Kliment Ohridski", Sofia, Bulgaria

[21] Appl. No.: 276,212

[22] Filed: Nov. 23, 1988

[30] Foreign Application Priority Data

Nov. 30, 1987 [BG] Bulgaria ............................. 82012

[51] Int. Cl.$^4$ ............................................. H01S 3/13
[52] U.S. Cl. ...................................... 372/29; 372/34; 372/38
[58] Field of Search ................... 372/29, 34, 36, 38; 357/81

[56] References Cited

U.S. PATENT DOCUMENTS

| | | | |
|---|---|---|---|
| 4,571,728 | 2/1986 | Yoshikawa | 372/36 |
| 4,573,159 | 2/1986 | Aagano et al. | 372/34 |
| 4,631,728 | 12/1986 | Simons | 372/38 |
| 4,683,573 | 7/1987 | Albanese | 372/34 |
| 4,689,659 | 8/1987 | Watanabe | 357/81 |
| 4,701,607 | 10/1987 | El-Hanany et al. | 250/205 |
| 4,727,554 | 2/1988 | Watanabe | 372/36 |
| 4,834,477 | 5/1989 | Tomita et al. | 350/6.2 |

OTHER PUBLICATIONS

Japanese Journal of Applied Physics, vol. 19, No. 11, Nov. 1980, pp. 2181–2185—Toshihiko Yoshino.
Unite Laser, Soro-France-Metrilas M. 100—E,ppl, 3,26–32.

Primary Examiner—Frank Gonzalez
Attorney, Agent, or Firm—Herbert Dubno

[57] ABSTRACT

The moment of switching of the system for active thermoregulation of a resonator length of a frequency stabilized laser first switches on the feed of the laser tube and then continuously measuring the electric signal which depends on the laser resonator temperature. The signal is compared with a reference electric signal and at equalizing of both signals is switched the system for active thermoregulation of the resonator length of the frequency stabilized laser. The electric signal depending on laser resonator temperature is proportional to the rate of its temperature expansion.

4 Claims, 2 Drawing Sheets

LASER FREQUENCY STABILIZATION BY ACTIVE RESONATOR LENGTH REGULATION

FIELD OF THE INVENTION

Our present invention relates to a method and device for determining an instant of switching of a system for active thermoregulation of resonator length of frequency-stabilized lasers which are used for measuring purposes.

BACKGROUND OF THE INVENTION

A method is known for determining the instant of switching of a system for active thermoregulation of a resonator length of a frequency stabilized laser (Toshiko YOSHIKO, Frequency Stabilization of Internal Mirror HeNe ($\lambda=633$ nm) Laser Using the Polarization Journal of Applied Physics, 19, 11, 1980, pp. 2181-2185) in which the moment of switching of a system for active thermoregulation of resonator length of a frequency stabilized laser is determined after the experimentally optimized time elapsed after the moment of the initial switching.

A disadvantage of the known method for determining the moment of switching of the system for active thermoregulation of the resonator length of frequency stabilized lasers is that it reduces the reproducibility of the frequency of laser radiation and it diminishes the admissible change in ambient temperature after initial conditions of stabilization are established, because it does not take into consideration the change of temperature and the air convection at the working site during the laser initialization regime.

A method is also known for determining the moment of switching of the system for active thermoregulation of the resonator length for a frequency stabilized laser (SORO-FRANCE, Metrilas M., 100 IE—Manuel d'utilisation et de Maintenance, 1976), in which after switching the laser tube, an electric signal depending on the laser resonator temperature is measured and is compared with a supporting electric signal and upon the equality of both signals, the system for active thermoregulation of the resonator length of a frequency stabilized laser is switched. The electric signal depending on the laser resonator temperature is generated by the thermosensitive element that is mounted on the resonator.

A disadvantage of this known method for determining the moment of switching of the system for active thermoregulation of the resonator length of frequency stabilized lasers is that it reduced the reproducibility and increased the time for entering into the regime, because it does not take into consideration the impact of the ambient temperature at the moment of switching of the laser.

The last-mentioned device for determining the moment of switching of the system for active thermoregulation of resonator length of a frequency stabilized lasers comprises a comparator, the output of which is connected with the control input of the system for active thermoregulation of the resonator length of the frequency stabilized laser. Its first input is connected with a unit generating an electric signal depending on the laser resonator temperature. Its second input is connected with a source of a supporting or reference signal. The unit generating the electric signal depending on the laser resonator temperature is formed by a thermoresistance incorporated in a voltage divider. The thermoresistance is mounted on the laser tube.

A disadvantage of the known device for determining of the moment of switching of the system for active thermoregulation of the resonator length of frequency stabilized lasers is that the time for initialization of the frequency of laser radiation depends on the ambient temperature in the working site at the moment of switching of the laser because the device switches the system for active thermoregulation of the resonator length always at the same temperature of the laser resonator.

OBJECT OF THE INVENTION

The object of the invention is to provide a method and a device for determining of the moment of switching of the system for active thermoregulation of the resonator length of a frequency stabilized laser that will ensure an increase in reproducibility of the laser radiation frequency and an increase in the admissible change in ambient temperature after stabilization independently of the change of temperature and air convections during the establishment of the stabilization regime and the value of ambient temperature at the moment of switching of the laser, as well as a reduction of the time for initialization of laser stabilization.

SUMMARY OF THE INVENTION

This object is achieved in a method of determining of the moment of switching of the system for active thermoregulation of the resonator length for frequency stabilized lasers in which after switching of the continuous feeding of the laser tube, an electric signal is measured which depends on the laser resonator temperature and is compared with a reference electric signal. Upon equalizing of both signals, the system for active thermoregulation of the resonator length of frequency stabilized lasers is switched. The electric signal depending on the laser resonator temperature is proportional to the rate of its temperature increase.

The object of the invention is attained also by a device for determining the moment of switching of the system for active thermoregulation of the resonator length of a frequency stabilized laser implementing the aforedescribed method which comprises a comparator. The output of the comparator is connected with the control input of the system for active thermoregulation of the resonator length for the frequency stabilized laser. The first input of the comparator is connected with a unit generating an electric signal which is a function of the temperature of the laser resonator. Its second input is connected with a source of the reference signal. The unit generating the electric signal depending on the laser resonator temperature can comprise two photoreceivers of the system for active thermoregulation of the resonator length of the frequency stabilized laser, while its connection with the first input of the comparator is performed through a series connection of a series diferential amplifier, a signal shaper and an integrator.

The advantages of the method and device for determining the moment of switching of the system for active thermoregulation of the laser resonator length of the frequency stabilized laser according to the invention are as follows: increase in the reproducibility of the laser radiation frequency and increase in the admissible change in ambient temperature of the working site after stabilization independently of the change in temperature and air convection during initialization of the stabilization regime as well as a reduction in the time for entering the regime.

BRIEF DESCRIPTION OF THE DRAWING

The above objects, features and advantages of our invention will become more readily apparent from the following description, reference being made to the accompanying drawing in which.

SPECIFIC DESCRIPTION

Figure 1:
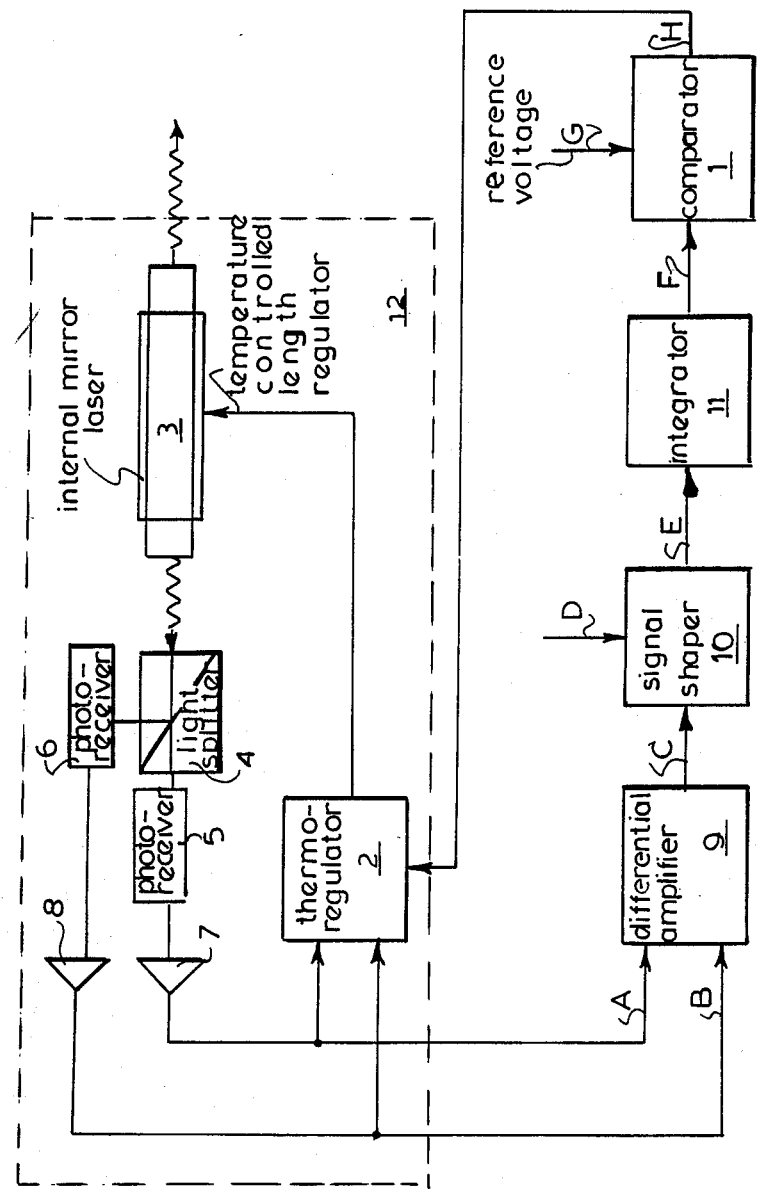
FIG. 1 is a block diagram of the device for determining the moment of switching the system for active thermoregulation of the resonator length of a frequency stabilized laser.

The device for determining the moment of switching of the system for active thermoregulation of the resonator length of a frequency stabilized laser comprises a comparator 1, the output of which is connected with the control input of the unit 2 for active thermoregulation of the resonator of the frequency stabilized laser 12. The output of the comparator 1 is connected with the thermal element of the laser tube 3. The laser tube 3 is connected optically through the polarization light divider 4 with photoreceivers 5 and 6 in the two downstream branches of the splitter 4. The photoreceivers 5 and 6 are electrically connected through the amplifiers 7 and 8 with the unit 2 for active thermoregulation of the resonator of the frequency stabilized laser. The first input of comparator 1 is connected with the outputs of the photoreceivers 5 and 6 through the series connection of a differential amplifier 9, a signal shaper 10 and an integrator 11. The second input of comparator 1 is connected with the source of reference voltage G. The laser tube 3, the unit 2 for active thermoregulation of the laser resonator, the polarization light divider 4, the photoreceivers 5 and 6 and the amplifiers 7 and 8 form the system for active thermoregulation of the resonator length of the frequency stabilized laser 12.

Figure 2:
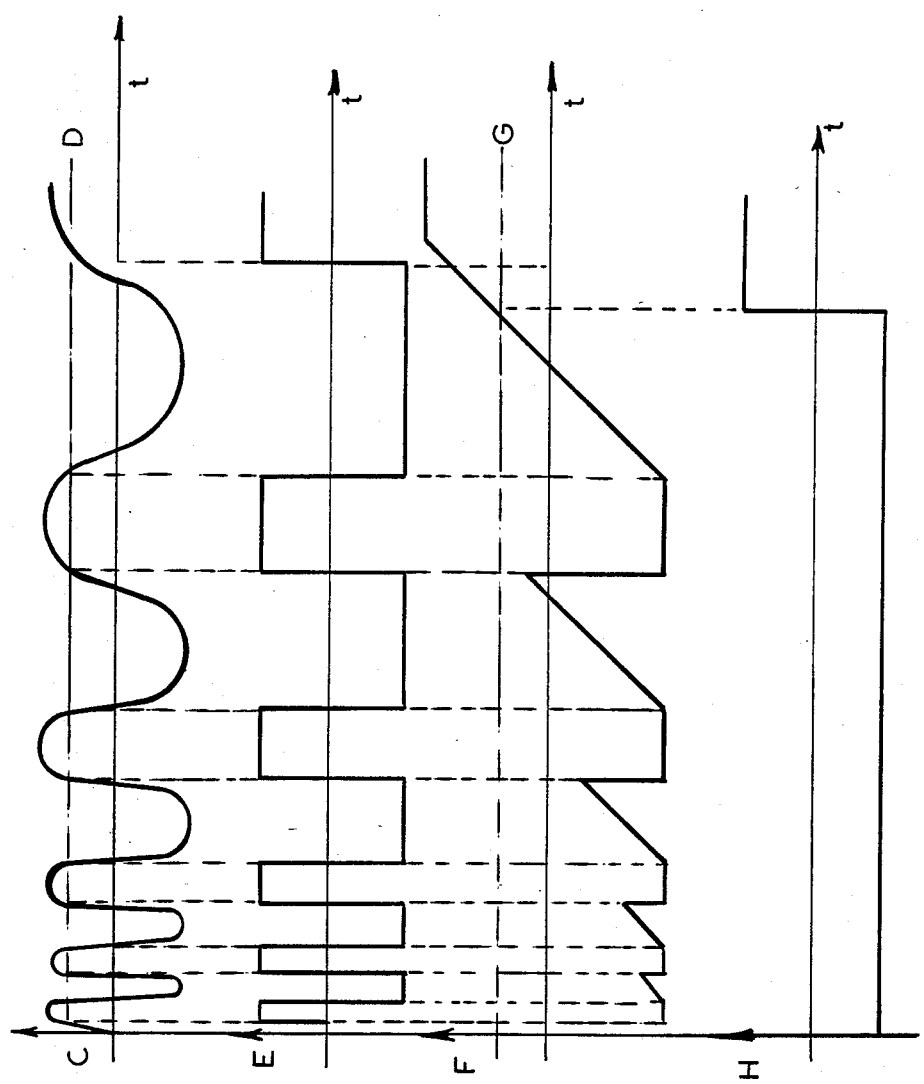
FIG. 2 represents a time diagram of the signals at characteristic points of the device.

The operation of the device for determining of the moment of switching of the system for active thermoregulation of the resonator length of the frequency stabilized laser is as follows:

First, the feeding of the laser tube 3 is switched on. The laser radiation emanating from the rear mirror of the laser resonator (e.g. a He-Ne internal mirror laser) is divided by the polarization light divider 4 and falls on the photoreceivers 5 and 6. The laser tube 3 has internal mirrors and an undefined polarization. The polarization light divider 4 is so tuned with respect to the laser tube 3 that the signals from the photoreceivers 5 and 6 correspond to the change in intensity of both polarizations of the laser radiation in changing the length of resonator of the laser tube 3 as a result of temperature deformations. After triggering of the discharge of laser tube 3 and switching on of its heater with maximal power the length of the laser resonator begins to increase and does so as a gradually diminishing rate. The electric signals from photoreceivers 5 and 6 are periodic. The period increases proportionally to the decrease in rate of the thermal expansion of the resonator of the laser tube 3. The signals outputted by the photoreceivers are amplified by operational amplifiers 7 and 8 and are passed to both inputs of the differential amplifier 9. At the inputs of differential amplifier 9 enter signals A and B (FIG. 2) corresponding to the intensity of both polarizations of the laser radiation. The difference between the signals A and B is fed to the signal shaper 10 having a threshold D while the bipolar signal E that is formed there, is integrated by the integrator 11. The integrator 11 has a very small time constant for positive signals while for negative signals its time constant is $t=(15-30)S$. The comparator 1 follows the level of output signal F (FIG. 2) of the integrator 11 and in reaching of preset level G of the reference voltage, it generates a signal H for switching of the unit 2 for active thermoregulation of the resonator of frequency stabilized laser 12 to commence active thermoregulation. Thus laser 12 enters into a regime of regulating always at the same rate independently from the temperature of the ambient medium, air convection and the changes during entry into the regime. This rate is, in general, from 6 to 8 $\lambda/2$ for min where $\lambda$ is the length of the wave of the laser tube 3 used.

We claim:

1. A method of thermoregulation of an internal mirror laser having a temperature controlled resonator length regulator which comprises the steps of:
    (a) continuously energizing said laser to cause said laser to generate a light output at a back mirror thereof;
    (b) deriving from said light output an electric signal which is a function of the temperature of the laser resonator and of a rate of thermal expansion thereof;
    (c) comparing said electric signal with a reference signal; and
    (d) initiating thermoregulation of the length of said resonator by controlled energization of the temperature controlled length regulator only upon equalization of said electric signal and said reference signal, and thereafter continuously controlling the length of said resonator in response to said light output.

2. The method defined in claim 1 wherein said electric signal is formed by:
    ($b_1$) splitting said light output into two differently polarized light outputs;
    ($b_2$) generating respective electrical signals from each of said differently polarized light outputs;
    ($b_3$) amplifying each of the electric signals generated by said differently polarized light outputs;
    ($b_4$) feeding the amplified electric signals to a differential amplifier and obtaining a difference signal therefrom;
    ($b_5$) subjecting said different signal to signal shaping; and
    ($b_6$) integrating a signal resulting from step ($b_5$) to produce an integrated signal which is the electric signal which is a function of the temperature of the laser resonator and of a rate of thermal expansion thereof.

3. An apparatus for the thermoregulation of an internal mirror laser having a temperature controlled resonator length regulator, comprising:
    means for energizing said laser to cause said laser to generate a light output at a back mirror thereof;
    means positioned to receive said light output and deriving from said light output an electric signal which is a function of temperature of the laser resonator and of a rate of thermal expansion thereof;
    a comparator connected to said means means for deriving and to a source of a reference signal for comparing said electric signal with said reference signal; and a thermoregulator connected to said temperature-controlled resonator length regulator and operatively connected to said comparator for initiating thermoregulation of the length of said resonator by controlled energization of the temperature controlled length regulator only upon equalization of said electric signal and said reference signal and for thereafter continuously controlling the length of said resonator in response to said light output.

4. The apparatus defined in claim 3 wherein said means for deriving includes:

a light splitter positioned to receive said light output and to generate two differently polarized light outputs;

respective photoreceivers receiving said differently polarized light outputs for generating respective electrical signals representing the differently polarized light outputs;

respective amplifiers connected to said photoreceivers for amplifying the electrical signals resulting therefrom;

a differential amplifier having two inputs respectively connected with said amplifiers and an output generating a difference signal;

a signal shaper connected to said output of said differential amplifier; and an integrator connected to said signal shaper for producing said electrical signal which is a function of the temperature of the laser resonator and of a rate of thermal expansion.

* * * * *